United States Patent [19]

Sigmund

[11] 4,160,470

[45] Jul. 10, 1979

[54] LOG SHEARING AND SPLITTING DEVICE

[75] Inventor: Richard W. Sigmund, Medford, Wis.

[73] Assignee: Timbern, Ltd., Medford, Wis.

[21] Appl. No.: 885,612

[22] Filed: Mar. 13, 1978

[51] Int. Cl.[2] .......................... A47J 42/09; B27L 7/00

[52] U.S. Cl. ................................ 144/3 B; 144/193 A; 144/3 K

[58] Field of Search .............. 144/3 K, 193 R, 193 A, 144/326 R, 323, 3 B

[56] References Cited

U.S. PATENT DOCUMENTS

| | | | |
|---|---|---|---|
| 3,455,352 | 7/1969 | Sanders et al. | 144/312 |
| 3,862,651 | 1/1975 | Heikkinen | 144/193 A |
| 4,076,061 | 2/1978 | Greeninger | 144/193 A |

*Primary Examiner*—Donald R. Schran
*Assistant Examiner*—W. D. Bray
*Attorney, Agent, or Firm*—Kinney, Lange, Westman and Fairbairn

[57] ABSTRACT

The firewood making machine of the present invention automatically produces firewood from larger logs. The larger logs are loaded into a first trough and are advanced by a predetermined length past a shearing-type cutter. The predetermined length log sections are cut off and are lowered into a second trough. A hydraulic ram drives the logs in the second trough against fixed splitting blades to split the logs into split firewood logs of the predetermined length.

17 Claims, 5 Drawing Figures

FIG. 5
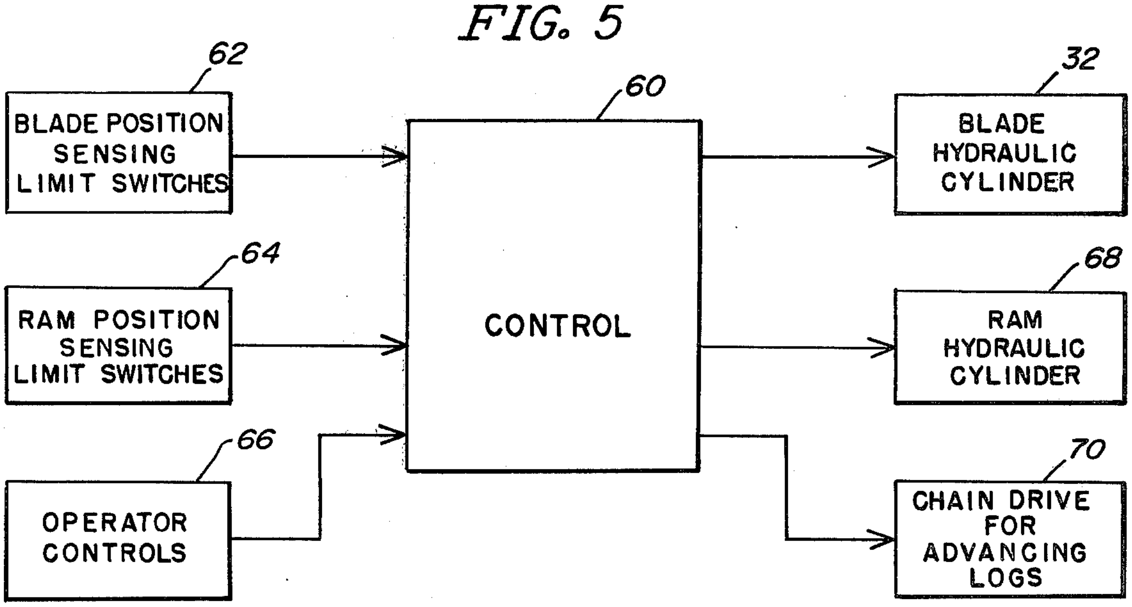
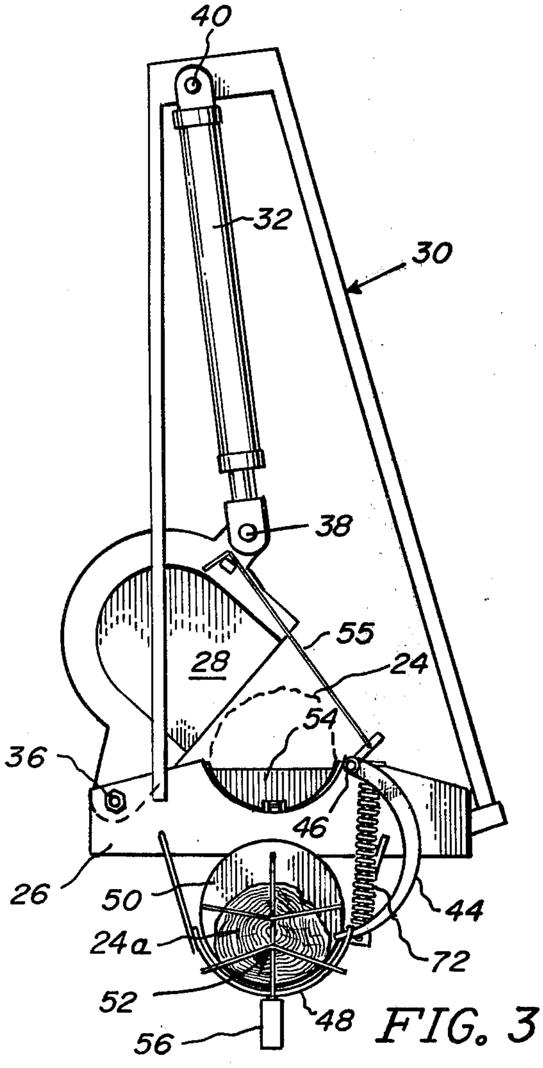
FIG. 3
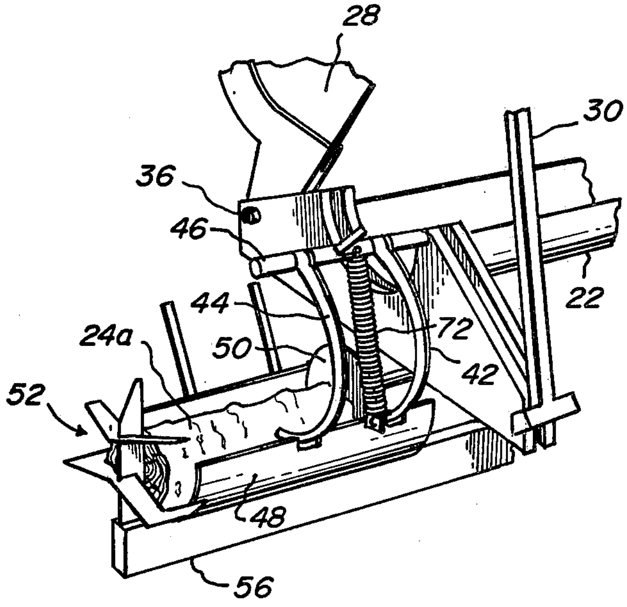
FIG. 4

LOG SHEARING AND SPLITTING DEVICE

BACKGROUND OF THE INVENTION

The present invention relates to machinery for making firewood from large logs. In particular, the present invention is an automatic firewood making machine which cuts and splits logs into split firewood logs of a predetermined length.

In recent years, fireplaces in residential homes have achieved a renewed popularity. Fireplaces are being used as both a decorative part of the home and as a supplementary heat source during the winter.

One problem encountered by homeowners having fireplaces in residential areas is the relatively high cost of firewood. This high cost is, at least in part, due to the large amount of manual labor required to cut trees into logs of the desired length and then splitting the logs lengthwise to form the split fireplace logs. Although semi-automated systems have been attempted, these systems have had relatively limited ability and limited success. In many cases, the systems have not been truly automatic in that manual labor was still required. Several workers were required to load the machine, to take cut logs to a splitter, and to stack the logs after they have been split. In addition, the machines have generally not been portable. In other words, it has been necessary to move logs at a logging site to the machine, rather than moving the machine to individual piles of logs. Finally, most firewood making machines have been capable of handling only a single log at a time. While this presents no problem if large diameter logs are being processed, the production time is significantly increased if smaller diameter logs are used. For example, it may take up to 16 times as long to produce a cord of firewood from 4-inch diameter logs as from 16-inch diameter logs.

SUMMARY OF THE INVENTION

The firewood making machine of the present invention overcomes the problems associated with the prior art machines. Rapid automatic cutting and splitting of logs into split firewood of predetermined length is achieved with the present invention, thereby permitting significant cost savings in the production of firewood.

The firewood making machine of the present invention includes a first trough means for receiving logs. The logs are advanced a predetermined length past shearing means. The shearing means cuts the logs after they have been advanced, and the cut lengths are received in a second trough means. Ram means drives the cut lengths against splitting blade means to split the logs into split firewood logs of the predetermined length.

BRIEF DESCRIPTION OF THE DRAWINGS

FIG. 3 shows an end view of the machine after a predetermined length has been cut from a log and the retractable fingers have lowered the cut log section of predetermined length into the second trough.

FIG. 4 shows the cut log sections being driven in the second trough against the splitting blades.

FIG. 5 is a block diagram of the control system of the machine.

DETAILED DESCRIPTION OF THE PREFERRED EMBODIMENTS

Figure 1:
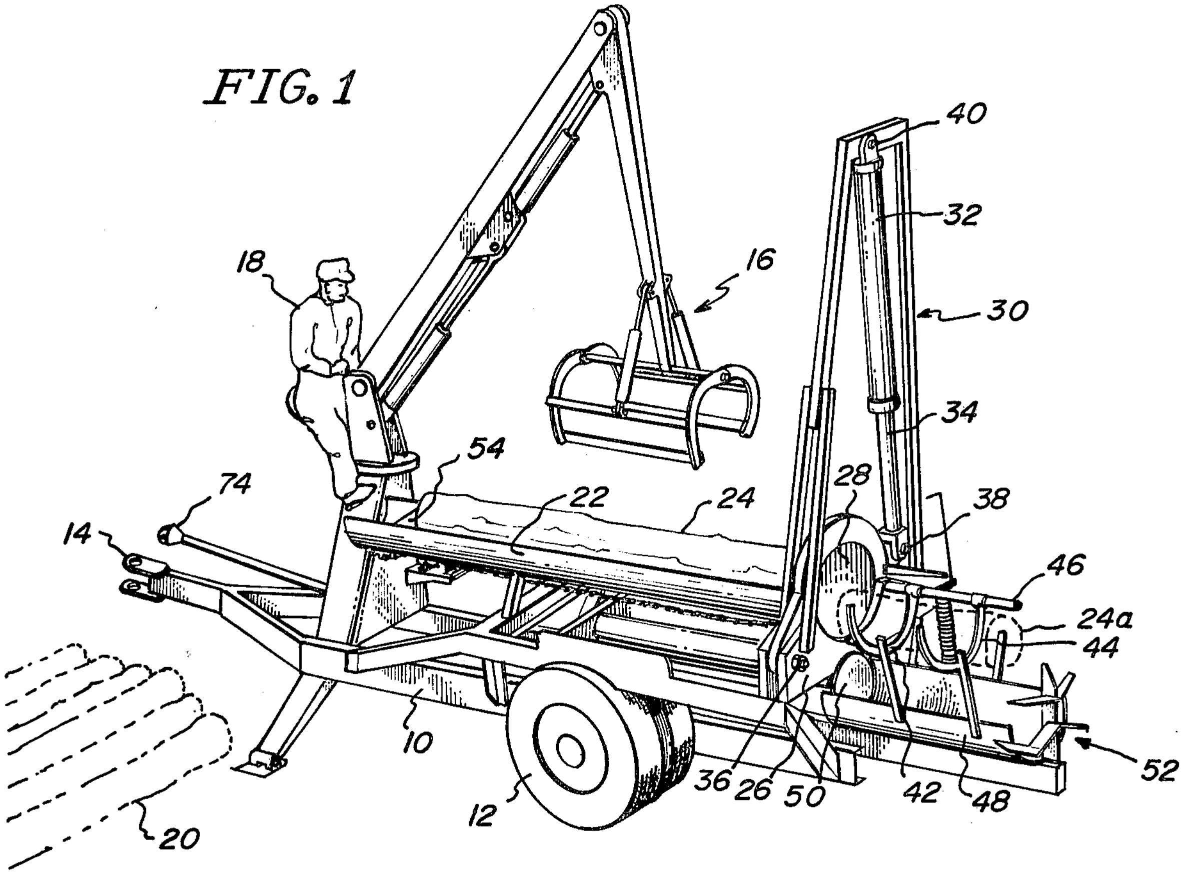
FIG. 1 shows the automatic firewood making machine of the present invention as logs are loaded into the first trough.

FIG. 1 shows the firewood making machine of the present invention as it begins operation. In the preferred embodiment shown in FIG. 1, the firewood making machine is built on a frame 10 with wheels 12 so that it can be moved between logging sites as well as from location to location at a particular logging site. Hitch 14 may be attached to a truck or trailer for transporting the firewood making machine.

Mounted on frame 10 is a clamshell-type loader 16. Operator 18 controls clamshell loader 16 to deposit logs from log pile 20 into first cylindrical trough 22. Although FIG. 1 shows a single log 24 in trough 22, the firewood making machine of the present invention is capable of processing multiple logs at one time up to a predetermined total diameter (such as 16 inches). The machine differs, therefore, from other firewood making machines in that it is not limited to one-log-at-a-time operation.

Log 24 and the logs of pile 20 are a standard length, such as 8 feet. The desired length for firewood is, of course, considerably shorter than this total 8 foot length. One typical length is 16 inches, so that six firewood sections of 16 inches can be cut from each log 24.

A shearing-type cutter is used to cut the long logs in trough 22 into the desired lengths. The shearing-type cutter includes shearing base 26, shearing blade 28, A-frame 30, hydraulic cylinder 32, and piston 34. Shearing blade 28 is connected to base 26 by first pivot pin 26. At the opposite end of blade 28, second pivot pin 38 connects piston 34 to blade 28. A third pivot pin 40 connects hydraulic cylinder 32 to A-frame 30 at the top of A-frame 30.

Blade 28 is shown in FIG. 1 at its lowest position; in this position it engages base 26. In order to cut log 24, piston 34 moves upward in cylinder 32 and retracts blade 28 to its retracted position. Shearing blade 28 is then driven downward from its retracted position to its engaging position by piston 34. In one preferred embodiment, approximately 124,000 pounds of shearing force is applied as blade 28 is driven downward by piston 34.

FIG. 1 also shows guiding fingers 42 and 44, which receive the cut section 24a of log 24 after blade 28 has sheared off the section. Fingers 42 and 44 are connected to shaft 46, which pivots about its axis to retract fingers 42 and permit cut section 24a to drop into second trough 48.

At one end of second trough 48 is hydraulic ram 50, and at the opposite end are fixed splitting blades 52. After cut section 24a has been deposited in trough 48 by fingers 42 and 44, ram 50 drives section 24a against fixed blades 52 to split section 24a into split fireplace logs of the predetermined length.

Figure 2:
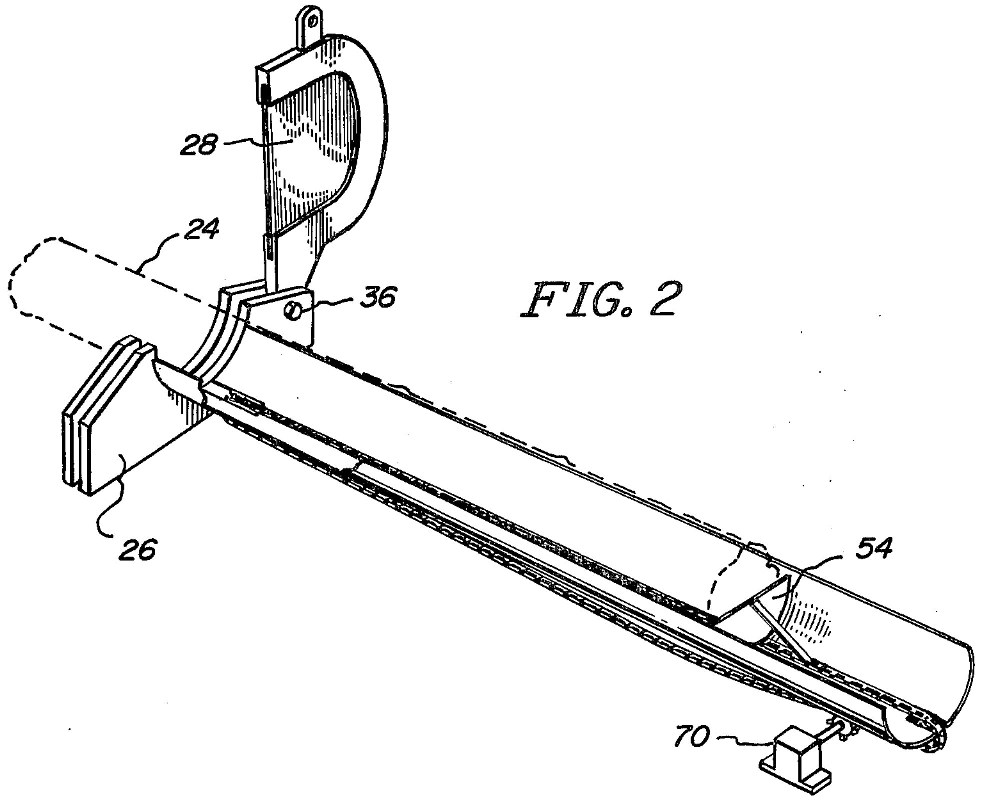
FIG. 2 shows the firewood making machine as the logs are advanced and the shearing blade is retracted.

FIG. 2 shows log 24 after it has been deposited in first trough 22 and as it is being driven by driving plate 54 a predetermined length past shearing blade 28. In a preferred embodiment, driving plate 54 is a chain driven plate which pushes log 24 along first trough 22.

As shown in FIG. 2, blade 28 is in its retracted position. When the predetermined length (e.g. 16 inches) of log 24 has been driven past blade 28, hydraulic cylinder 32 drives piston 34 and blade 28 downward to shear off section 24a.

When log section 24*a* has been cut from log 24, a limit switch senses that blade 28 has reached its bottom-most engaging position and causes piston 32 to begin retracting blade 28. Linkage 55 causes shaft 24 to rotate, thereby retracting fingers 42 and 44 and causing section 24*a* to drop into second trough 28.

FIGS. 3 and 4 show the machine after fingers 42 and 44 have been retracted and hydraulic ram 50 has begun to ram log section 24*a* past fixed splitting blades 52. In the preferred embodiment shown in FIGS. 1–4, blades 52 include one vertical member and two horizontal members which are mounted to the frame 56 underlying trough 48. Driving log section 24*a* past blades 52 causes section 24*a* to be split into split firewood logs of the desired length.

In a preferred embodiment, ram 50 does not push log 24*a* entirely through blades 52. Instead, the rear end of log 24*a* is pushed to within about 1 inch of blade 52. Ram 50 is then withdrawn to its original position until the next log section is dropped into second trough 28. The next ramming operation drives the remainder of previously split log section 24*a* through blades 52 and onto a conveyor (not shown) positioned near the end of the machine to receive the split logs from blades 52.

In a preferred embodiment of the present invention, the advancing, shearing, and splitting operations of the machine are synchronized to provide totally automatic operations. FIG. 5 is a block diagram of the control system which synchronizes these operations.

In FIG. 5, control 60 controls and synchronizes the various operations of the machine as a function of input signals from blade position sensing limit switches 62, ram position sensing limit switches 64, and operator controls 66. Blade position sensing limit switches 62 are preferably two limit switches which sense the position of shearing blade 28 at the two end positions of its travel. From the two blade position limit switches 62, it is possible to determine whether blade 28 is at either end position or somewhere between the two end positions. Similarly, ram position limit switches are preferably two limit switches which sense the position of ram 50 at its two end positions. With the two ram position sensing limit switches 64 it is possible to determine whether ram 50 is at either end of its travel or between the two end points.

Operation is commenced by the operator controls 66. Controls 66 preferably include a dead man switch which permits the operator to halt operation of the firewood making machine at any time by lifting his foot.

Control 60 controls the operation of hydraulic cylinder 32 (which drives shearing blade 28), hydraulic cylinder 68 (which drives ram 50), and chain drive 70 (which drives advancing drive plate 54).

Initially, blade 28 and ram 50 are in their retracted positions. When a log 24 is placed in first trough 22 and operator 18 commences a cycle, control 60 causes chain drive 70 to being driving log 24 a predetermined length past shearing blade 28. When this advance has been completed, control 60 actuates hydraulic cylinder 32, which drives blade 28 downward to shear off section 24*a* of log 24. As blade 28 moves downward, spring 72 rotates shaft 46 to move fingers 42 and 44 into position to receive a cut log section 24*a*.

When blade 28 reaches the bottom of its travel, its position is sensed by limit switches 62, and control 60 applies signals to hydraulic cylinder 32 to cause blade 28 to begin retracting. Linkage 55 begins rotating shaft 46 as blade 28 retracts, thereby retracting fingers 42 and 44. When fingers 42 and 44 have been retracted, control 60 actuates ram hydraulic cylinder 68 to cause ram 50 to drive toward blades 52.

When ram 50 has traveled its entire length, ram position sensing limit switches 64 indicate the control 60 that ram 50 has completed its travel, and control 60 causes ram hydraulic cylinder 68 to withdraw ram 50 to its original position. At the same time, control 60 causes chain drive 70 to advance driving plate 54 by the next predetermined length. Shearing blade 28, having been retracted, is ready to shear another log section 24*a* from log 24 as soon as the splitting and advancing operations are completed. Similarly, the splitter (i.e. trough 48, ram 50 and blades 52) is ready to split another log section 24*a* as soon as the shearing operation is completed. This provides a significant increase in the speed at which cutting and splitting operations can be performed.

In one preferred embodiment of the present invention, a separate power source (not shown) such as an automobile engine is used to drive a pump for the hydraulic circuits. Alternatively, the machine may have a power take off 74 which can be connected to a tractor or other vehicle to supply the necessary power for the hydraulic pump.

Another important advantage of the present invention is the use of a clamshell or other automatic loader to deposit the logs in first trough 22. This loading operation, as well as the sequencing of the cutter and the splitter, can be performed by a single operator 18 located at the operator station. In the preferred embodiment all operator controls are mounted in front of the operator 18, and a dead man switch is provided so that operation will stop immediately if the operator takes his foot off of a foot pedal.

Still another important improvement in the present invention is the capability of handling multiple logs rather than the single log. The only limitation on the number of logs that can be loaded is the size of troughs 22 and 48 and the size of shearing blade 28. It makes no difference whether a single log or multiple logs are being cut and split. The capability of handling multiple logs yields significant increases in productivity when smaller diameter logs are being handled.

The present invention permits automatic loading, cutting, and splitting of logs into firewood with a portable or movable machine. This is a significant advantage since it is generally expensive to move logs to the firewood making machine. In most logging operations, it is advantageous to move the machine to the logs. This avoids the waste of valuable skidding time. While the present invention accomplishes all of the necessary functions, it is still a small enough unit that it may be moved from pile to pile of logs around a logging site rather than requiring moving all of the logs to the machine.

In conclusion, the present invention represents a significant advance in the making of firewood. The present invention is portable, is operated by a single operator, is entirely automatic, is synchronized to achieve maximum output, is capable of handling either single or multiple logs, and cuts the logs by shearing mechanism which is far simpler, safer, and free of the problems of accumulating sawdust associated with a saw-type cutter. Although the present invention has been described with reference to preferred embodiments, workers skilled in the art will recognize that changes may be made in form and detail without departing from the spirit and scope of the invention.

What is claimed is:

1. A firewood making machine comprising:

first substantially horizontal trough means for receiving logs;

clamshell loading means for loading logs into the first trough means;

advancing means for advancing the logs in the first trough means a predetermined length past a cutting location;

cutting means located at the cutting location for cutting log sections of the predetermined length from the logs after the advancing means has advanced the logs;

second substantially horizontal trough means positioned to receive the log sections, the second trough means being positioned essentially parallel to the first trough means and below the cutting means;

log guiding means for receiving the log sections after the cutting means cuts the log sections and lowering the log sections to the second trough means;

splitting blade means positioned at a fixed position along the second trough; and ram means for driving the log sections in the second trough against the splitting blade means to split the logs into split firewood logs of the predetermined length.

2. The firewood making machine of claim 1 wherein the cutting means has a movable cutting blade and wherein the log guiding means lowers the logs to the second trough means when the cutting blade is being retracted after cutting.

3. The firewood making machine of claim 2 wherein the log guiding means comprises retractable fingers.

4. The firewood making machine of claim 1 wherein the cutting means comprises shearing means having a movable shearing blade for cutting the log sections from the logs.

5. The firewood making machine of claim 4 wherein the shearing means comprises:

a cutting base;

a movable shearing blade, the blade being pivotably connected to the cutting base;

frame means connected to and extending above the cutting base;

a hydraulic cylinder pivotably connected to the frame means; and piston means movable in the hydraulic cylinder and being pivotably connected to the blade.

6. The firewood making machine of claim 4 and further comprising:

blade position sensing means for providing blade position signals indicative of the position of the movable shearing blade;

ram position sensing means for providing ram position signals indicative of the position of the ram means; and control means for synchronizing the operation of the advancing means, the cutting means, and the ram means as a function of the blade and ram position signals.

7. The firewood making machine of claim 6 and further comprising:

log guiding means for receiving the log sections after the cutting means cuts the log sections and lowering the log sections to the second trough means.

8. The firewood making machine of claim 7 wherein the control means also synchronizes the operation of the log guiding means as a function of the blade and ram position signals.

9. The firewood making machine of claim 1 and further comprising:

frame means for supporting the firewood making machine;

a plurality of wheels; and hitch means for attachment to a powered vehicle.

10. A firewood making machine comprising:

first trough means for receiving logs;

advancing means for advancing the logs in the first trough means a predetermined length past a cutting location;

cutting means located at the cutting location for cutting log sections of the predetermined length from the logs after the advancing means has advanced the logs;

second trough means positioned to receive the log sections, the second trough means being positioned essentially parallel to the first trough means and below the cutting means;

log guiding means for receiving the log sections after the cutting means cuts the log sections and lowering the log sections to the second trough means;

splitting blade means positioned at a fixed position along the second trough; and ram means for driving the log sections in the second trough against the splitting blade means to split the logs into split firewood logs of the predetermined length.

11. The firewood making machine of claim 10 wherein the cutting means has a movable cutting blade and wherein the log guiding means lowers the logs to the second trough means when the cutting blade is being retracted after cutting.

12. The firewood making machine of claim 11 wherein the log guiding means comprises retractable fingers.

13. A firewood making machine comprising:

first trough means for receiving logs;

advancing means for advancing the logs in the first trough means a predetermined length past a cutting location;

cutting means located at the cutting location for cutting log sections of the predetermined length from the logs after the advancing means has advanced the logs, the cutting means comprising shearing means having a movable shearing blade for cutting the log sections from the logs;

second trough means positioned to receive the log sections;

splitting blade means positioned at a fixed position along the second trough;

ram means for driving the log sections in the second trough against the splitting blade means to split the logs into split firewood logs of the predetermined length;

blade position sensing means for providing blade position signals indicative of the position of the movable shearing blade;

ram position sensing means for providing ram position signals indicative of the position of the ram means; and control means for synchronizing the operation of the advancing means, the cutting means, and the ram means as a function of the blade and ram position signals.

14. The firewood making machine of claim 13 and further comprising:

log guiding means for receiving the log sections after the cutting means cuts the log sections and lowering the log sections to the second trough means.

15. The firewood making machine of claim 14 wherein the control means also synchronizes the operation of the log guiding means as a function of the blade and ram position signals.

16. A firewood making machine comprising:

first trough means for receiving logs;

advancing means for advancing the logs in the first trough means a predetermined length past a cutting location;

cutting means located at the cutting location for cutting log sections of the predetermined length from the log after the advancing means has advanced the log, the cutting means comprising:

a cutting base;

a movable shearing blade, the blade being pivotably connected to the cutting base;

frame means connected to and extending above the cutting base;

a hydraulic cylinder pivotably connected to the frame means; and piston means movable in the hydraulic cylinder and being pivotably connected to the blade;

second trough means positioned to receive the log sections;

splitting blade means positioned at a fixed position along the second trough; and rams means for driving the log sections in the second trough against the splitting blade means to split the logs into split firewood logs of the predetermined length.

17. The firewood making machine of claim 16 wherein the movable shearing blade has an engaging position where it engages the cutting base and a retracted position, and wherein the hydraulic cylinder and piston means drive the movable shearing blade from the retracted to the engaging position to cut the logs.

* * * * *